Nov. 9, 1965 J. L. BROWN 3,216,166
FASTENER INSTALLATION
Filed Jan. 12, 1961
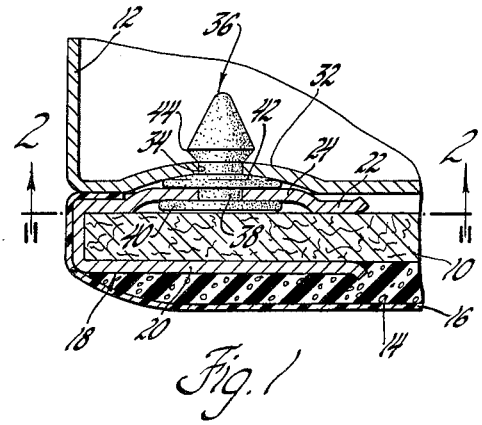
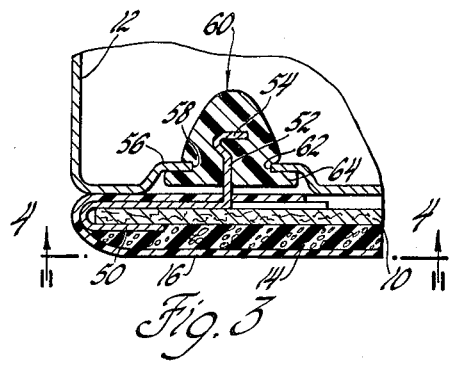
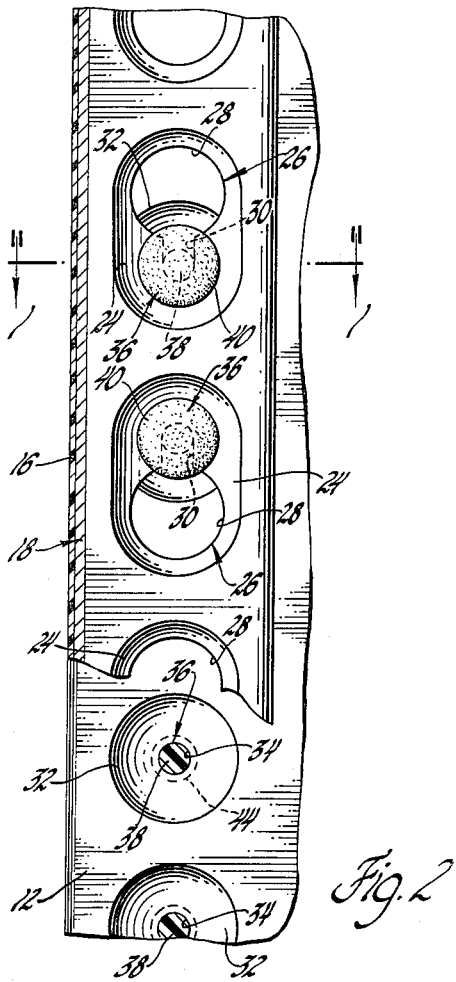
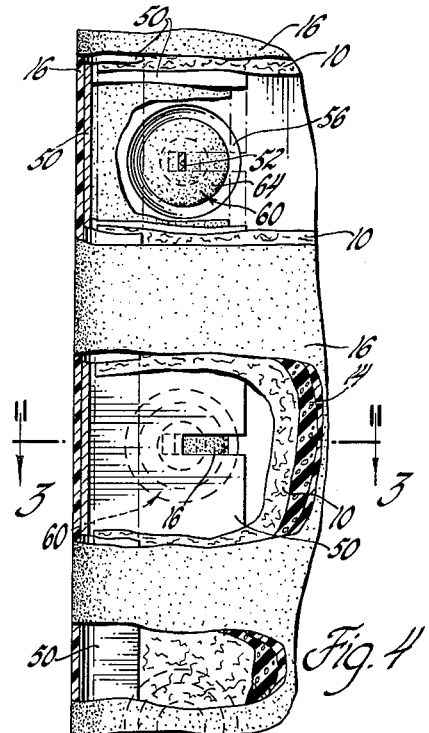
INVENTOR.
Joseph L. Brown
BY
E. W. Christen
ATTORNEY … # 3,216,166
FASTENER INSTALLATION
Joseph L. Brown, Mount Clemens, Mich., assignor to General Motors Corporation, Detroit, Mich., a corporation of Delaware
Filed Jan. 12, 1961, Ser. No. 82,208
1 Claim. (Cl. 52—511)

This invention relates to fastening means, and more particularly to a hidden fastening installation for securing a panel to a support.

In the design and manufacture of many articles it is often necessary to secure parts together in such a manner as to hide the fastening device and prevent an unsightly appearance. A typical example of such installation is in securing the upholstered inner panel of a vehicle door to the base structure of the door itself. In the typical door installation, a fiberboard panel or the like may be covered with a padding material and a trim material, and the assembly is secured to the door frame. It has been the practice in the past to make the attachment with some sort of fastening device which is inserted through the trim material, padding and panel and into the support. This requires either some sort of expensive ornamental head on the fastening devices used, or some special covering therefor in order to provide a pleasing appearance.

The device in which this invention is embodied comprises, generally, a fastening installation in which the fastener device is mounted on the inner side of one part and in a position to be installed in the other part, as by a simple push or the like. The fastening device does not extend through the panel and is thus hidden from view, providing a more pleasant appearance to the installation. The fastening device provides a positive retention of the parts together and at the same time seals the openings in the parts against the entry of dirt and other foreign materials.

These and other advantages will become more apparent from the following description and drawings, in which:

FIGURE 1 is a cross-sectional view of a typical installation showing the fastening device in its installed position;

FIGURE 2 is a plan view of a plurality of such installations taken substantially along the line 2—2 of FIGURE 1 and looking in the direction of the arrows;

FIGURE 3 is a cross-sectional view of a modification of the fastener installation illustrated in FIGURES 1 and 2; and FIGURE 4 is a plan view of a series of installations, as illustrated in FIGURE 3, taken substantially along the line 4—4 of FIGURE 3 and looking in the direction of the arrows.

Referring more particularly to the drawing, FIGURE 1 best illustrates a typical installation in which such a fastening device is to be used. A panel, illustrated by the numeral 10, which may be a door inner panel and made of fiberboard or the like, is thereby secured to a support 12, which may be the door frame or some other suitable structure. The panel 10 is to be covered by a padding material 14, which is held in place by a trim material 16 covering the padding 14 and is to be secured around the edges of the panel 10.

In order to secure the panel 10 to the support 12, a binding strip, illustrated generally by the numeral 18, is provided. Binding strip 18 has a substantially U-shaped cross-section, as illustrated in FIGURE 1, and may extend along the length of one edge of the panel 10. The edges of the legs 20 and 22 of the strip 18 may be biased towards each other in order to provide frictional engagement of the binding strip 18 on the panel 10, thus permitting movement of a subassembly comprising these parts from place to place during the assembly of the vehicle.

Binding strip 18 is provided with an elongated depression 24 formed in leg 22 and a series of these depressions extend along the length of the binding strip and thus along the edge of the panel 10. In each of the depressions 24 is formed an aperture 26, best illustrated in FIGURE 2. Aperture 26 is shown to include a circular portion 28 and a slot portion 30, which intersects the circular portion and forms what might be called a keyhole slot. The depressions and apertures may be formed in the binder strip 18 such that adjacent apertures 26 are reversed, i.e., the slotted portion 30 of one aperture 26 is adjacent the slotted portion of the next aperture, and the circular portion 28 of one aperture is adjacent the circular portion of the next aperture. This provides for a more secure lock of the binder strip and the panel 10 to the support 12, as will be more fully understood.

A series of depressions 32 are formed in the support 12 and adjacent the depressions 24 formed in the binder strip 18. Each of these depressions 32 is provided with a circular opening 34 for purposes to be later described. The spacing is such that the openings 34 are exactly opposite, or as closely opposite as possible, to the outer ends of the slotted portions 30 of the apertures 26 formed in the binder strip 18.

In order to secure the binder strip and the panel 10 to the support 12, a resilient plastic button, illustrated generally by the numeral 36, may be employed. Button 36 has a shank portion 38 terminating in an enlarged circular flange 40. A second flange 42 is spaced from flange 40 along the shank 38 a distance substantially equal to the width of the binder strip 18. Flange 40 is of sufficient size to pass freely through the circular portion 28 of the aperture 26, and shank 38 is of sufficient size to pass freely into slotted portion 30 of the aperture 26. Thus, it may be seen that the resilient button 36 is easily mounted in the depression 24 by sliding in the aperture 26.

The opposite end of the resilient button 36 from the flanges 40 and 42 is provided with annular barb portion 44, slightly greater in diameter than the opening 34 formed in the support 12. The resiliency of the button 36 permits the annular barb 44 to be forced through the opening 34 to secure the button 36, the binding strip 18 and the panel 10 in place on the support 12. A plurality of such buttons, one secured in each of the apertures 26 formed in the binder strip 18, will secure the panel 10 to the support 12. Further, the dimensions of the button may be such as to provide a clamping action between the adjacent portions of the binder strip 18 and the support 12 in order to clamp the end of the trim material 16 disposed therebetween and thus secure the trim material in place over the padding 14 and on the panel 10.

FIGURES 3 and 4 illustrate a modification of the above-described installation. Similarly, a panel 10 is to be secured to a support 12 and the panel 10 is provided with a padding material 14 and trim material 16. The binder strip 50 again has a generally U-shaped cross-sectional configuration and is secured over an edge of the panel 10.

In this modification, binder strip 50 has a series of tabs 52 bent at right angles therefrom and terminating in a hook portion 54. A series of such tabs may be provided along the length of the binder strip and extending toward the support 12.

Support 12 is provided with a plurality of depressions 56 having openings 58 formed therein to receive a resilient fastening member, illustrated generally by the numeral 60. Fastening member 60 may be molded directly over the tab 52, and the hook portion 54 of the tab prevents the tab from pulling away from the member 60. The fastener is provided with a groove 62 and a flange 64 in order to secure the device in the depression 56 and in the aperture 58.

In the installation of the device illustrated in FIGURES 3 and 4, it is merely necessary to push the fastening member 60 into the openings 58 formed in the support 12, the natural resilience of the member 60 being sufficient to permit it to pass freely through the opening 58 and to properly engage the groove 62 and flange 64 on opposite sides of the depression 56. The dimensions of this installation may also be such as to clamp the edge of the trim material 16 between the support and the binder strip 50 and retain the trim material 16 and the padding material 14 to the panel 10, and at the same time secure the panel 10 to the support 12.

In each of the above-described modifications the fastening installation is hidden from view and yet provides a positive and sealed securement of a panel to a support. Although the device is illustrated and described with respect to a door panel, it is to be understood that the device may be used in any situation where a blind fastening is required.

What is claimed is:

An installation comprising:
a support having apertures therein;
a panel secured to said support;
a generally U-shaped channel member having leg portions positioned on both sides of said panel thereby biasingly holding said panel therebetween, one of said leg portions being adjacent to said support and having elongated depressions formed therein, each of said depressions having a keyhole-shaped opening therein including a narrow and a wide portion with the narrow portions of said keyhole openings being aligned with the apertures in said support, the keyhole openings alternately having their narrow and wide portions oppositely oriented relative to each other;
and resilient buttons received in said keyhole openings and said apertures in said support to secure said channel member to said support and to restrain said channel member from moving relative to said support, said buttons having retaining head portions extending through the apertures in said support and flange portions abutting said channel member when said buttons are in the narrow portions of said keyhole openings and aligned with the apertures, the engagement of the head portions with the support holding the buttons in said narrow portions.

References Cited by the Examiner

UNITED STATES PATENTS

| | | | |
|---|---|---|---|
| 961,698 | 6/10 | Jerauld | 50—321 |
| 1,760,262 | 5/30 | Walters | 45—138 |
| 1,760,267 | 5/30 | Carr | 189—34 |
| 1,782,239 | 11/30 | Ledwinka | 45—138 |
| 1,889,903 | 12/32 | Place | 45—138 |
| 1,952,439 | 3/34 | Jones | 45—138 |
| 1,970,335 | 8/34 | Place | 189—34 |
| 2,070,839 | 2/37 | Place | 189—88 |
| 2,389,375 | 11/45 | Lundholm | 20—92 |
| 2,709,290 | 5/55 | Rosenthal | 24—204 |
| 3,115,225 | 12/63 | Fraylick et al. | 189—88 |

FOREIGN PATENTS

| | | |
|---|---|---|
| 505,822 | 9/54 | Canada. |
| 1,239,607 | 7/60 | France. |

RICHARD W. COOKE, JR., *Primary Examiner.*

CORNELIUS D. ANGEL, HENRY C. SUTHERLAND, JACOB L. NACKENOFF, *Examiners.*